April 29, 1958 W. H. CALVER 2,832,237
CHAIN SAW VISE
Filed Jan. 11, 1954 2 Sheets-Sheet 1
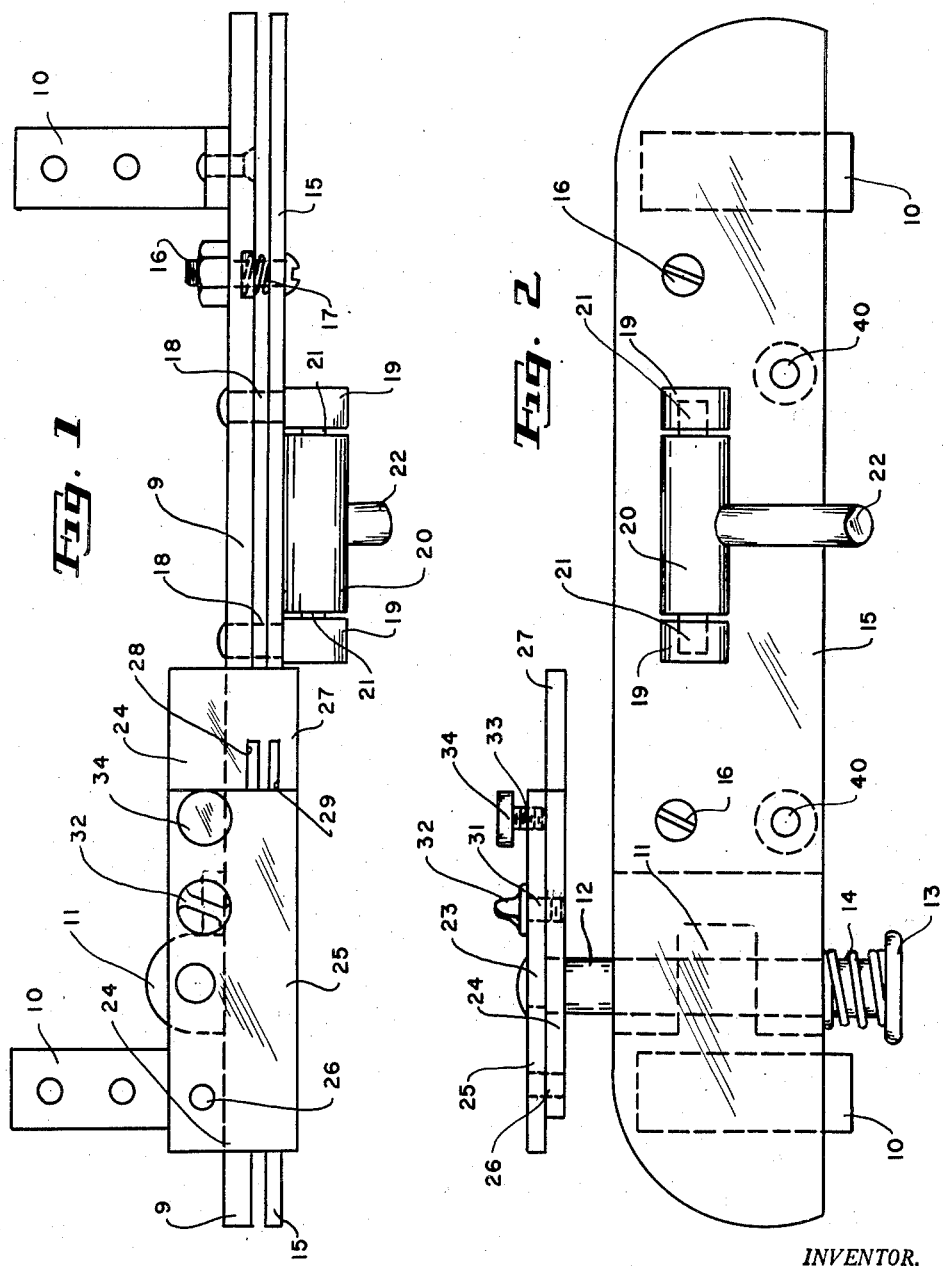
INVENTOR.
WILLIAM HOWARD CALVER
BY
Thos S Donnelly
ATTORNEY April 29, 1958  W. H. CALVER  2,832,237
CHAIN SAW VISE
Filed Jan. 11, 1954  2 Sheets-Sheet 2
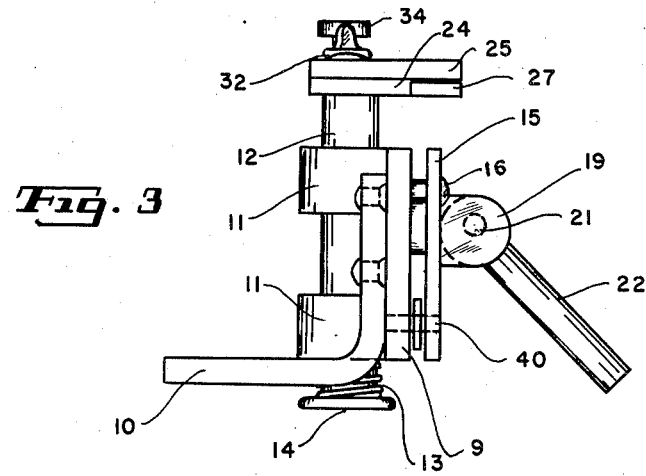
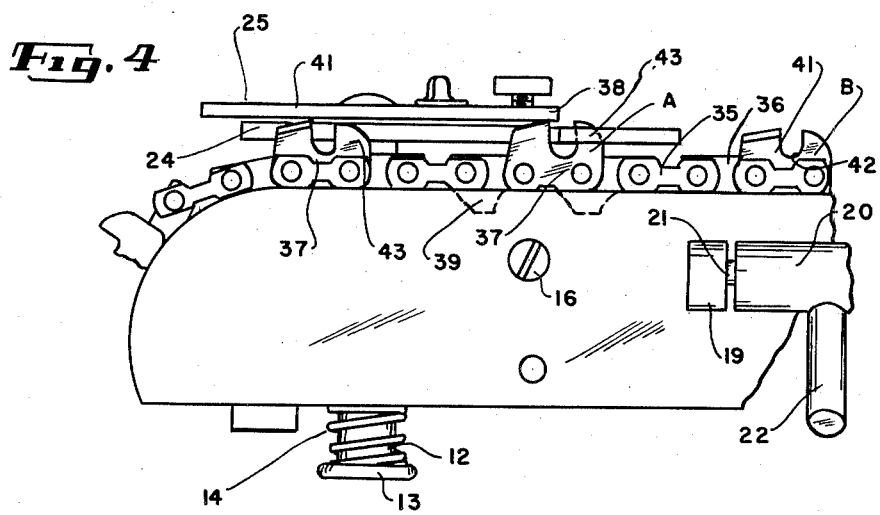
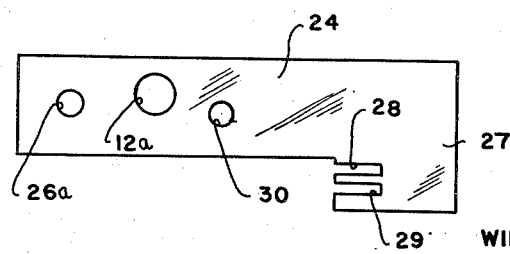
INVENTOR.
WILLIAM HOWARD CALVER
BY
Thos. J. Donnelly
ATTORNEY

2,832,237
CHAIN SAW VISE

William Howard Calver, Tipton, Mich., assignor to Clinton Machine Company, Clinton, Mich., a corporation of Michigan Application January 11, 1954, Serial No. 403,197

7 Claims. (Cl. 76—78)

My invention relates to a new and useful improvement in a chain saw vise, in which the chain saw may be mounted for sharpening the cutting elements and shortening the depth gauge members to the proper length. In chain saws a linkage construction is provided and secured to some of the links or forming a link is a cutting member. The saws cutting member projects out from the endless belt or chain and the link carrying the cutting member may be termed the cutting tooth. There is also provided on the chain an abutment member which is termed a depth gauge and which limits the depth of cut of the cutting tooth. Sometimes the depth gauge is formed integrally with the cutting tooth, and sometimes it is located in front of or behind and separate from the cutting tooth. This cutting tooth usually is inclined to the bottom of the kerf and in the sharpening of the cutting portion the amount of projection of the cutting portion outwardly from the chain is reduced. Consequently, in order to maintain the same depth of cut of the cutting portion, it is necessary to shorten the abutment or depth gauge. The present invention is intended as a means of holding the chain saw while the sharpening and cutting operations are being carried on.

It is the object of the present invention to provide a vise of this class which will be simple in structure, economical of manufacture, durable and highly efficient in use.

Another object of the invention is the provision of a simple and effective means for regulating the amount of shortening which is effected on the depth gauge.

In the type of chain saw illustrated, one cutting element projects laterally in one direction and its adjacent cutting element projects laterally in the opposite direction, so that the depth gauge of one cutting element is out of alignment with the depth gauge of another cutting element. It is the further object of the present invention to provide a vise having a pair of depth gauge receiving portions so that when a chain saw is placed in the vise all of the depth gauges may be easily and quickly reduced to the proper length.

Further objects will appear hereinafter.

It is recognized that various modifications and changes may be made in the detail of structure illustrated and it is intended that the present disclosure shall be considered to be but the preferred embodiment.

Forming a part of this specification are drawings in which,

Fig. 1 is a top plan view of the invention.
Fig. 2 is a side elevational view of the invention.
Fig. 3 is an end elevational view of the invention.
Fig. 4 is a fragmentary side elevational view showing a portion of a saw chain mounted thereon.
Fig. 5 is a top plan view of a gauge plate used in the invention.

The invention comprises a supporting plate 9, secured to which and projecting outwardly therefrom are brackets 10 which may be secured to a table, bench or other suitable supporting body. Projecting outwardly from one face of the plate 9 are knuckles 11, through which is slidably projected a post 12 having a head 13 formed thereon and against which engages one end of a coil spring 14, the upper end of the spring 14 engaging the lower of the knuckles 11 so that the post 12 is normally urged downwardly.

The clamping plate 15 is positioned alongside of the plate 9 and secured thereto by bolts 16, embracing each of which is a coil spring 17 normally urging the plate 15 away from the plate 9.

Projecting through the plate 9 are pins 18 which also slidably project through the plate 15. Carried by each of these pins 18 is a lug 19. A cam 20 is provided with the studs 21 at each end thereof, which extend eccentrically from the member 20 and project into the lugs 19.

The handle 22 is secured to the member 20 and serves as a means for rocking the member 20. The construction is such that when a saw chain is positioned on the vise a portion of the same will project between the plates 14 and 15. The rocking downwardly of the member 20 will force the plate 15 toward plate 9 and securely clamp the saw chain between these plates. In this downwardly rocking movement the cam 20 will be rocked past center so that the saw chain will be securely held in position.

The post 12 is provided with a reduced terminal portion 23. This post 12, below the reduced portion 23, projects through a gauge plate 24, lying on top of which is a contact plate 25. The reduced portion 23 projects through this contact plate 25 and is upset thereon so that the plate 25 is irremovably mounted on the post 12. A stud 26 projects through both of the plates 24 and 25. The contact plate 25 is wider than the main body of the gauge plate 24, but this plate 24 is provided on one end with a lateral extension 27 (Fig. 5) in which is formed a pair of spaced-apart slots 28 and 29, the plate 24 being provided with an opening 26a for reception of the pin 26 and an opening 12a for reception of the post 12. This plate 24 is also provided with a threaded opening 30 into which threads a screw 31 provided with a head 32, this screw rotatively projecting through the plate 25 and the head 32 serving as a means for rotating the screw 31. Threaded through the plate 25 is a screw 33 provided with a head 34, whereby the screw 33 may be rotated. By rotation of the screw 31 the plate 24 may be moved downwardly or upwardly on the post 12, away from or toward the plate 25, the plate 24 in this movement riding on the guide pin 26.

In the drawings I have shown the chain comprising the links 35, spacing members 36, cutting tooth 37 and additional spacing members 38; these spacing members 38 having a tongue 39 projecting downwardly.

In the practice of this invention, an endless chain saw of the type described is placed upon the vise when the plates 9 and 15 are in spread apart relation, so that the tongues 39 engage between these plates 9 and 15, a portion of the links 35 and the cutting tooth 37 resting upon the upper edges of the plates 9 or 15. The handle 22 is then rocked downwardly so that the extensions 39 are securely clamped between the plates 9 and 15 and the saw thus secured on the vise. In this movement of the plates 15 and 9 relatively to each other, these plates slide on the bolts 16 and also on the guide pins 40 which project from the plate 9 and through the plate 15. The cutting portion 41 of the cutting tooth 37 at its downwardmost point engages the undersurface of the plate 25. When the cutting tooth B has been moved to the position shown in Fig. 4, the cutting portion 41 may be sharpened, and particularly at its forward edge 42. It is assumed that the cutting portion of the tooth A has been sharpened and it has been moved into the position where the gauge depth member or tongue 43 projects through one of the slots 28 or 29. The outwardly projecting edge of the cutting portion 41 will engage the undersurface of the plate 25 and the gauge portion or tongue 43 will project upon the upper face of the plate 24. The operator then files off this projecting portion of the gauge tongue 43 until it is level with the upper face of the plate 24 so that the gauge tongue 41 is thus reduced in length to correspond to the distance of outward projection of the cutting portion 41. In these saws, since the cutting teeth are laterally faced in the opposite direction, the gauge tongue 43 of alternate teeth will project through the slot 29 and the gauge tongue of the other teeth will project through the slot 28. Consequently, the upper face of the extension 27 of the plate 24 is used as a gauge surface to which the length of the depth gauge or tongue 43 is reduced.

This gauge portion 43 is usually shorter or projects out a less distance than the cutting face of the cutting portion 41. When the tooth A has been moved into the position shown in Fig. 4 so that it engages the under surface of the plate 25, the gauge portion 43 will project outwardly through one of the slots and the upper face of the portion 27 of the plate 24 will be the surface to which the gauge tongue 43 is filed down. Consequently, if this gauge tongue or portion 43 is to be of less height than the advancing face of the cutting portion 41, it is necessary that the upper surface of the plate 24 be moved downwardly to lie below the lower face of the plate 25. To accomplish this, the screw 32 is backed out to allow the plate 24 to be moved downwardly. After backing out the screw 32 the screw 33 is then rotated to press the plate 27 downwardly to the proper position. The amount of downward movement of the plate 24 will of course be dependent upon the amount of rotation of the screw 33. The screw 33 may be graduated if desired. When the proper position has been reached the screw 31 is again tightened so that the plates are held in fixed relation with the upper face of the portion 27 position below the lower face of the plate 25 the desired amount.

In this manner the saw may be easliy and quickly sharpened and sized. When it is desired to place the chain between the plates 9 and 15, the post 12 is moved upwardly against the downward bias of spring 14, by pressing upwardly on the head 13, and, the plates 24 and 25 are then swung 90 degrees on the post 12 as a pivot so that the space between the plates 9 and 15 is clear. In this way I have provided a simple, easily operated and highly efficient chain saw vise for the purpose referred to.

What I claim is:

1. In a chain saw vise of the class described, a stationary abutment member; a movable plate adjacent said abutment member and movable towards and away from the same, said movable plate being normally spaced from said abutment member to provide a space for reception of a portion of a saw chain; a plate positioned above said abutment member, engageable at its under surface with the cutting end of a cutter on said saw chain; and a gauge plate positioned below and adjustably connected to said last-named plate and movable downwardly and upwardly thereof, and having a slot formed therein for reception of a depth gauge on said cutter.

2. In a chain saw vise of the class described, a stationary abutment member; a movable plate adjacent said abutment member and movable towards and away from the same, said movable plate being normally spaced from said abutment member to provide a space for reception of a portion of a saw chain; a plate positioned above said abutment member, engageable at its under surface with the cutting end of a cutter on said saw chain; a gauge plate positioned below and adjustably connected to said last-named plate and movable downwardly and upwardly thereof and having a slot formed therein for reception of a depth gauge on said cutter; and a means for moving said last-named plate upwardly and downwardly.

3. In a chain saw vise of the class described, a stationary abutment member; a movable plate adjacent said abutment member and movable towards and away from the same, said movable plate being normally spaced from said abutment member to provide a space for reception of a portion of a saw chain; a plate positioned above said abutment member, engageable at its under surface with the cutting end of a cutter on said saw chain; a gauge plate positioned below and adjustably connected to said last-named plate and movable downwardly and upwardly thereof, and having a slot formed therein for reception of a depth gauge on said cutter; means for moving said last named plate upwardly and downwardly; and means for determining the amount of said upward and downward movement.

4. In a chain saw vise adapted for use with a chain saw having links and cutters, each of said cutters having a cutting portion and depth gauge portion, a stationary abutment member; a plate mounted on said abutment member and extending lengthwise thereof and movable towards and away from said abutment member; means for normally maintaining said plate in spaced relation to said abutment member to provide a space for reception of part of a saw chain; means for moving said movable plate towards said abutment member for clamping said part of said saw chain against said abutment member; a contact plate positioned above said abutment member for contacting at its under surface the cutting edge of a cutter; a gauge plate positioned below said contact plate and adjustably connected thereto, and having a passage formed therein for reception of the depth gauge of a cutter; and means for moving said gauge plate downwardly relatively to said contact plate for positioning the upper surface of said gauge plate below the lower surface of said contact plate.

5. In a chain saw vise adapted for use with a chain saw having links and cutters, each of said cutters having a cutting portion and depth gauge portion, a stationary abutment member; a plate mounted on said abutment member and extending lengthwise thereof and movable towards and away from said abutment member; means for normally maintaining said plate in spaced relation to said abutment member to provide a space for reception of part of a saw chain; means for moving said movable plate towards said abutment member for clamping said part of said saw chain against said abutment member; a contact plate positioned above said abutment member for contacting at its under surface the cutting edge of a cutter; a gauge plate positioned below said contact plate and adjustably connected thereto, and having a passage formed therein for reception of the depth gauge of a cutter; means for moving said gauge plate downwardly relatively to said contact plate for positioning the upper surface of said gauge plate below the lower surface of said contact plate; and means for securing said gauge plate in various positions of adjustment relatively to said contact plate.

6. In a chain saw vise adapted for use with a chain saw having links and cutters, each of said cutters having a cutting portion and a depth gauge portion, a stationary abutment member; a plate mounted on said abutment member and extending lengthwise thereof and movable towards and away from said abutment member; means for normally maintaining said plate in spaced relation to said abutment member to provide a space for reception of part of a saw chain; means for moving said movable plate towards said abutment member for clamping said part of said saw chain against said abutment member; a contact plate positioned above said abutment member for contacting at its under surface the cutting edge of a cutter; a gauge plate positioned below said contact plate and connected thereto, and having a passage formed therein for reception of the depth gauge of a cutter; means for moving said gauge plate downwardly relatively to said contact plate for positioning the upper surface of said gauge plate below the lower surface of said contact plate; means for securing said gauge plate in various positions of adjustment relatively to said contact plate; and means for swingably mounting said contact plate and said gauge plate on said abutment member.

7. In a chain saw vise of the class described, a stationary abutment member; a clamping member movably mounted on said abutment member and extending lengthwise thereof, said clamping member being normally spaced from said abutment member; means for moving said clamping member toward and away from said abutment member; a shaft pivotally and slidably mounted on said abutment member; a first gauge plate fixed on said shaft and overlying said members; means for normally biasing said first gauge plate toward said abutment member; and a second gauge plate adjustably mounted on said first gauge plate and overlying said members.

References Cited in the file of this patent

UNITED STATES PATENTS

| | | |
|---|---|---|
| 107,873 | Chavanne | Oct. 4, 1870 |
| 238,872 | Ellis | Mar. 15, 1881 |
| 505,626 | Huff | Sept. 26, 1893 |
| 663,322 | Anderson | Dec. 4, 1900 |
| 1,030,176 | Henderson | June 18, 1912 |
| 1,297,433 | Avery | Mar. 18, 1919 |
| 1,330,042 | Knizek | Feb. 3, 1920 |
| 2,318,456 | Blum | May 4, 1943 |
| 2,339,509 | Olson | Jan. 18, 1944 |
| 2,480,546 | Bryson | Aug. 30, 1949 |
| 2,529,646 | Wolf | Nov. 14, 1950 |
| 2,589,165 | Toy et al. | Mar. 11, 1952 |
| 2,594,821 | Stone et al. | Apr. 29, 1952 |
| 2,677,289 | Fitch | May 4, 1954 |

FOREIGN PATENTS

| | | |
|---|---|---|
| 343,893 | France | Oct. 17, 1904 |